United States Patent
Choi et al.

(10) Patent No.: US 10,495,528 B2
(45) Date of Patent: Dec. 3, 2019

(54) CAPACITIVE TORQUE SENSOR WITHOUT LIMIT IN FLEXURE HINGE

(71) Applicant: Research & Business Foundation SUNGKYUNKWAN UNIVERSITY, Suwon-si (KR)

(72) Inventors: Hyouk Ryeol Choi, Gunpo-si (KR); Ui Kyum Kim, Anseong-si (KR); Yong Bum Kim, Suwon-si (KR); Dong-Yeop Seok, Daegu (KR); Jin Ho So, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 141 days.

(21) Appl. No.: 15/928,546

(22) Filed: Mar. 22, 2018

(65) Prior Publication Data
US 2018/0274995 A1   Sep. 27, 2018

(30) Foreign Application Priority Data
Mar. 22, 2017   (KR) .................... 10-2017-0036069

(51) Int. Cl.
| | | |
|---|---|---|
| *G01L 1/00* | (2006.01) | |
| *G01L 1/14* | (2006.01) | |
| *G01L 5/22* | (2006.01) | |
| *G01L 5/16* | (2006.01) | |
| *B25J 17/00* | (2006.01) | |
| *B25J 13/08* | (2006.01) | |

(52) U.S. Cl.
CPC .............. *G01L 1/146* (2013.01); *G01L 5/165* (2013.01); *G01L 5/228* (2013.01); *B25J 13/085* (2013.01); *B25J 17/00* (2013.01)

(58) Field of Classification Search
CPC ......... G01L 1/146; G01L 5/165; G01L 5/228; B25J 13/085; B25J 17/00
USPC ................................... 73/862.046
See application file for complete search history.

(56) References Cited

U.S. PATENT DOCUMENTS

2015/0292969 A1* 10/2015 Choi ................ G01L 5/165
73/862.041

FOREIGN PATENT DOCUMENTS

| KR | 10-1477120 B1 | 12/2014 |
|---|---|---|
| KR | 10-1653914 B1 | 9/2016 |

\* cited by examiner

*Primary Examiner* — Jamel E Williams
(74) *Attorney, Agent, or Firm* — NSIP Law (57) ABSTRACT

Provided herein is a capacitive torque sensor, which can completely offset forces/torques in all axial directions, except for force/torque in a direction of a central axis, by measuring variations in capacitances of four sensing cells arrayed at angular intervals of 90 degrees on the basis of a center of the sensor and can offer a sensing value for the torque in a central axis direction.

19 Claims, 10 Drawing Sheets

|  | Cell$_1$ | Cell$_2$ | Cell$_3$ | Cell$_4$ |
|---|---|---|---|---|
| $F_x$ | ↓ | ↓ | ↑ | ↑ |
| $F_y$ | ↓ | ↑ | ↑ | ↓ |
| $F_z$ | — | — | — | — |
| $M_x$ | ↑ | ↓ | ↓ | ↑ |
| $M_y$ | ↓ | ↓ | ↑ | ↑ |
| $M_z$ | ↑ | ↓ | ↑ | ↓ |

CAPACITIVE TORQUE SENSOR WITHOUT LIMIT IN FLEXURE HINGE

CROSS-REFERENCE TO RELATED APPLICATION

This application claims priority to and the benefit of Korean Patent Application No. 10-2017-0036069 filed on Mar. 22, 2017 in the Korean Intellectual Property Office, and all the benefits accruing therefrom under 35 U.S.C. 119, the contents of which in its entirety are herein incorporated by reference.

BACKGROUND

1. Field

The present disclosure relates to a capacitive torque sensor, and more particularly, to a capacitive torque sensor without a limit in a flexure hinge.

2. Description of the Related Art

A torque sensor is an essential component attached to a joint of a robot to allow the robot to perform various operations while improving the reliability and accuracy of the robot.

However, most of existing torque sensors have used a strain gauge based on the principle of resistance changes and are rarely feasible to automate a strain gauge bonding work in terms of operational characteristics. Therefore, mass production of the torque sensor using a strain gauge is not allowed and the production cost is high. In addition, the torque sensor using a strain gauge has another drawback in that it is quite vulnerable to external impacts.

Additionally, in order to measure only a torque in a direction of a reference axis, interferences from axial directions other than the reference axis direction should be removed, which, however, requires complicated mechanisms and algorithms.

Accordingly, with all increasing needs, torque sensors have not been generally used in the fields of applications requiring a force/torque sensor, such as, for example, a robot.

SUMMARY

Therefore, an object of the present disclosure is to provide a capacitive torque sensor.

Another object of the present disclosure is to provide a capacitive torque sensor without a limit in a flexure hinge.

Another object of the present disclosure is to provide a capacitive torque sensor enabling miniaturization.

Another object of the present disclosure is to provide a capacitive torque sensor capable of outputting only a torque in a direction of a reference axis by simple calculation.

The above and other objects will be all accomplished by a capacitive torque sensor according to the present disclosure.

According to an aspect of the present disclosure, there is provided a capacitive torque sensor including a capacitive torque sensor including a sensing plate including four grooves formed at angular intervals of 90 degrees on the basis of a center point and four electrodes located at one-side of the four grooves, and a ground plate including four protrusion bars inserted into the four grooves of the sensing plate.

Electrodes located at one-side of a pair of grooves formed at angular intervals of 180 degrees, among the four grooves, may be arrayed to be at a clockwise one-side of the pair of grooves, and electrodes located at one-side of the other pair of grooves formed at angular intervals of 180 degrees may be arrayed to be at a counterclockwise one-side of the other pair of grooves, and the ground plate may move relative to the sensing plate when external force/torque are exerted.

The sensing plate may be a circular plate having the center point as a center of the circular plate, and the four grooves may be cut out from the circumference to the inside of the circular plate.

The grooves may be cut out along a cutting line extending from the circumference to the center of the circular plate.

The grooves may be in rotational symmetry about the center point.

The protruding bars inserted into the four grooves may be parallel with the electrodes.

The protruding bars may have isosceles trapezoid shaped sections.

The sensing plate may be a printed circuit board.

The capacitive torque sensor may have first to fourth sensing cells and each sensing cell may be constituted by one protruding bar inserted into one groove of the four grooves and one electrode located at one-side of the one groove, and assuming that two axes orthogonal to each other on a plane parallel with the sensing plate are denoted by an X axis and a Y axis, and an axis perpendicular to the X axis and the Y axis is denoted by a Z axis, a pair of sensing cells arrayed at angular intervals of 180 degrees, among the first to fourth sensing cells, may have opposite variations in capacitance by force/torque in a X-axis direction, force/torque in a Y-axis direction, and a torque in a Z-axis direction, there may be no variations in capacitances of the first to fourth sensing cells by a force in the Z-axis direction, and capacitances of a pair of sensing cells, among two pairs of sensing cells arrayed at angular intervals of 180 degrees, may be increased, while capacitances of the other pair of sensing cells are decreased.

The capacitive torque sensor may further include an arithmetic unit outputting capacitance variation values of the first to fourth sensing cells and sensing values M calculated by the following equation:

$$M = SF_1 * Cell_1 - SF_2 * Cell_2 + SF_3 * Cell_3 - SF_4 * Cell_4$$

wherein $Cell_1$ is a capacitance variation value of the first sensing cell, $Cell_2$ is a capacitance variation value of the second sensing cell, $Cell_3$ is a capacitance variation value of the third sensing cell, $Cell_4$ is a capacitance variation value of the fourth sensing cell, and $SF_1$, $SF_2$, $SF_3$, and $SF_4$ are weighted values for the first to fourth sensing cells.

The sensing values may be output only when the Z-axis torque is exerted, and the sensing value is zero when the X-axis force/torque, the Y-axis force/torque and the Z-axis force are exerted.

As described above, since the capacitive torque sensor according to the present disclosure has no limit in a flexure hinge, it can be miniaturized.

In addition, the present disclosure can provide a capacitive torque sensor capable of outputting only a torque in the direction of a reference axis by simple calculation.

DETAILED DESCRIPTION

Hereinafter, a capacitive torque sensor according to the present disclosure will be described in detail with reference to the accompanying drawings.

In the following description, only a portion required in understanding a capacitive torque sensor according to an embodiment of the present disclosure will be provided, and the explanation of other portions will be omitted in order not to confuse the gist of the present disclosure.

Furthermore, unless defined otherwise, all the terms used in this specification including technical and scientific terms would be generally understood by those skilled in the related art. The terms defined in generally used dictionaries should be construed as having the same meanings as those construed in the context of the related art, and unless clearly defined otherwise in this specification, should not be construed as having idealistic or overly formal meanings.

Throughout the specification of the present disclosure, when a component is referred to as "comprises" other elements, it is intended to mean that the component further comprises other elements, but do not exclude other elements, unless otherwise specified.

The orientation or positional relationship designated by the terminology used herein, such as "center", "vertical", "upper", "lower", "front", "rear", "left", "right", "perpendicular", "horizontal", "inside", "outside", "clockwise", "counterclockwise", "x axis", "y axis", "z axis" "center" and the like, may be based on the orientation or positional relationship indicated by the accompanying drawings and may be for brevity and clarity in interpreting and describing the present disclosure. However, since it is not proposed or suggested that an indicated device or component necessarily has a particular orientation or is constructed or manipulated in a particular direction, the terminology used herein may not be intended to be limiting of the present disclosure. Additionally, the terms "first", "second", and the like are only for the purpose of description, and relative significance of devices or components should not be construed as indicated or suggested by these terms.

Figure 1:
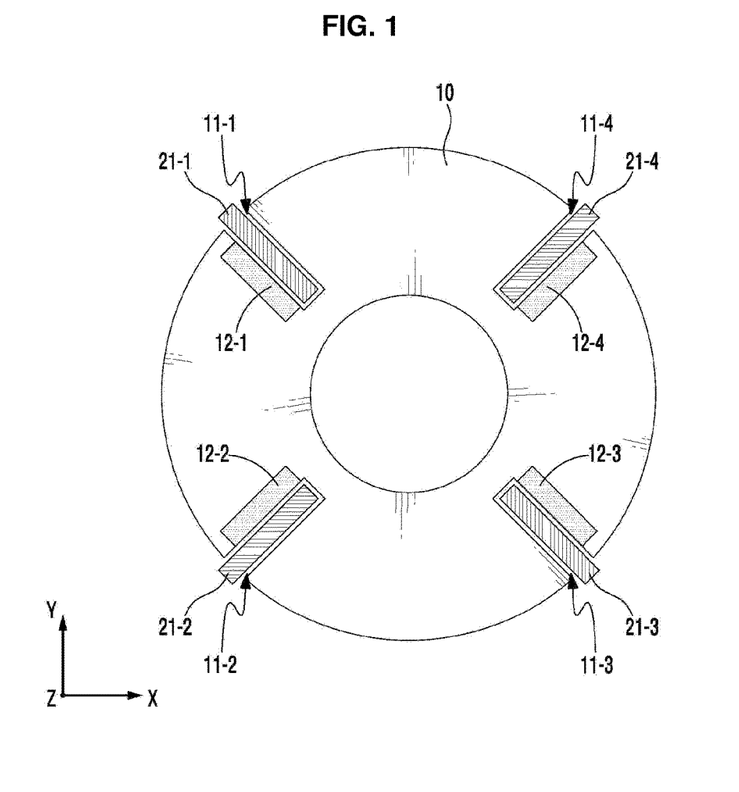
FIG. 1 is a plan view of a capacitive torque sensor according to an embodiment of the present disclosure.
Figure 2:
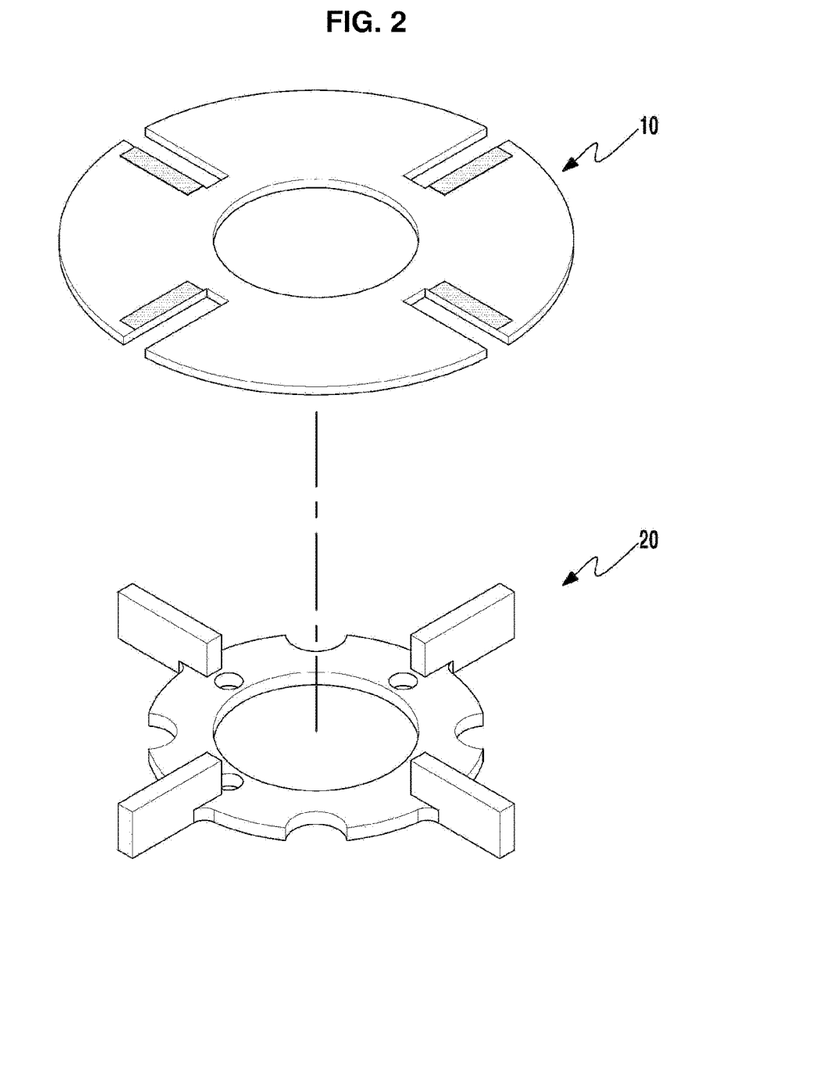
FIG. 2 is an exploded perspective view of the capacitive torque sensor according to an embodiment of the present disclosure.

FIG. 1 is a plan view of a capacitive torque sensor according to an embodiment of the present disclosure, and FIG. 2 is an exploded perspective view of the capacitive torque sensor according to an embodiment of the present disclosure shown in FIG. 2.

As shown in FIG. 2, the torque sensor according to an embodiment of the present disclosure may include a sensing plate 10 and a ground plate 20.

The sensing plate 10 includes four grooves 11-1, 11-2, 11-3 and 11-4 formed at angular intervals of 90 degrees on the basis of the center, and electrodes 12-1, 12-2, 12-3 and 12-4 are located at one-side of the four grooves 11-1, 11-2, 11-3 and 11-4.

Here, the electrodes 12-1 and 12-3 located at one-side of a pair of grooves 11-1 and 11-3 formed at angular intervals of 180 degrees, among the four grooves 11-1, 11-2, 11-3 and 11-4, are arrayed to be at counterclockwise one-side of the grooves 11-1 and 11-3, and the electrodes 12-2 and 12-4 located at one-side of the other pair of grooves 11-2 and 11-4 formed at angular intervals of 180 degrees are arrayed to be at clockwise one-side of the grooves 11-2 and 11-4.

The sensing plate 10 is preferably formed as a printed circuit board (PCB) on which circuits for applying power to electrodes and measuring capacitances from the electrodes.

In addition, the sensing plate 10 is preferably a circular plate (including a doughnut-shaped plate with a central region removed therefrom), and the four grooves may be formed by cutting out the circular plate a predetermined length from the circumference to the inside of the circular plate as shown in FIG. 1. Here, the circular plate is preferably cut out toward the center.

In addition, grooves 11 are preferably formed to include the respective grooves 11-1, 11-2, 11-3 and 11-4 having the same size and the same shape. Accordingly, the respective grooves 11-1, 11-2, 11-3 and 11-4 are preferably shaped in rotational symmetry at 90 degree angular intervals about the center of the circular plate. That is to say, preferably, the first groove 11-1 exactly coincides with the second groove 11-2 when it is rotated 90 degrees in a counterclockwise direction about the center, exactly coincides with the third groove 11-3 when it is rotated 180 degrees, and exactly coincides with the fourth groove 11-4 when it is rotated 270 degrees in a counterclockwise direction about the center.

The ground plate 20 is positioned above or below the sensing plate 10 and is configured such that capacitances are generated between electrodes of the sensing plate 10 and the ground plate 20.

To this end, the ground plate 10 may be configured to include electrodes having different potentials from those of the electrodes 12-1, 12-2, 12-3 and 12-4. However, capacitances may also be generated between the electrodes of the sensing plate 10 and the ground plate 20 by simply forming the ground plate 20 as a ground electrode in whole or at least in part.

In addition, as distances between the ground plate 20 and the electrodes of the sensing plate 10 are decreased, the capacitances generated are increased. Therefore, the ground plate 20 may be configured to include protruding bars 21 including four protruding bars 21-1, 21-2, 21-3 and 21-4, which protrude toward the sensing plate 10.

In order to manufacture the torque sensor according to an embodiment of the present disclosure, the ground plate 20 including the protruding bars 21 may be assembled such that the respective protruding bars 21-1, 21-2, 21-3 and 21-4 are inserted into grooves of the ground plate 20.

Therefore, the protruding bars 21-1, 21-2, 21-3 and 21-4 of the ground plate 20 are formed at positions and intervals corresponding to the grooves of the ground plate 20 so as to be inserted into the grooves of the ground plate 20.

In addition, when external force/torque are exerted on the torque sensor according to an embodiment of the present disclosure, the ground plate 20 moves relative to the sensing plate 10. Therefore, the protruding bars are formed to have a smaller width than the grooves, thereby allowing the protruding bars to move inside the grooves when the external force/torque are exerted on the torque sensor according to an embodiment of the present disclosure.

In addition, the protruding bar is preferably configured such that a surface of the protruding bar facing the electrode is parallel with the electrode, and the protruding bar and the electrode facing each other are preferably parallel with each other.

Figure 3:
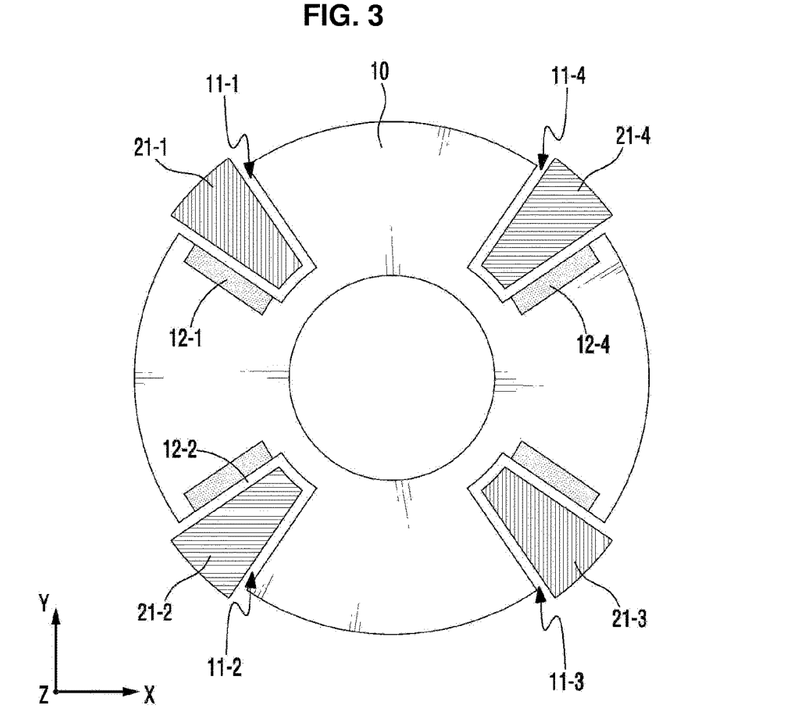
FIG. 3 is a plan view of a capacitive torque sensor according to another embodiment of the present disclosure.

To this end, as shown in FIG. 3, the groove bars 11 of the sensing plate 10 are cut out from the circumference to the inside of the circular plate, and the protruding bars 21 of the ground plate 20 are preferably configured to have an isosceles trapezoid shaped section.

The aforementioned torque sensor according to an embodiment of the present disclosure is manufactured by assembling the sensing unit 10 with the ground plate 20 such that the protruding bars 21 of the ground plate 20 are inserted into the grooves 11 of the sensing plate 10 to allow the protruding bar 21 of the ground plate 20 and the electrode 12 of the sensing plate 10 to face each other, thereby generating capacitance between the protruding bar 21 and the electrode 12.

Assuming that a protruding bar and an electrode, which generate capacitance therebetween, are referred to as a sensing cell, the capacitive torque sensor according to an embodiment of the present disclosure has four sensing cells arrayed at angular intervals of 90 degrees.

Figure 4:
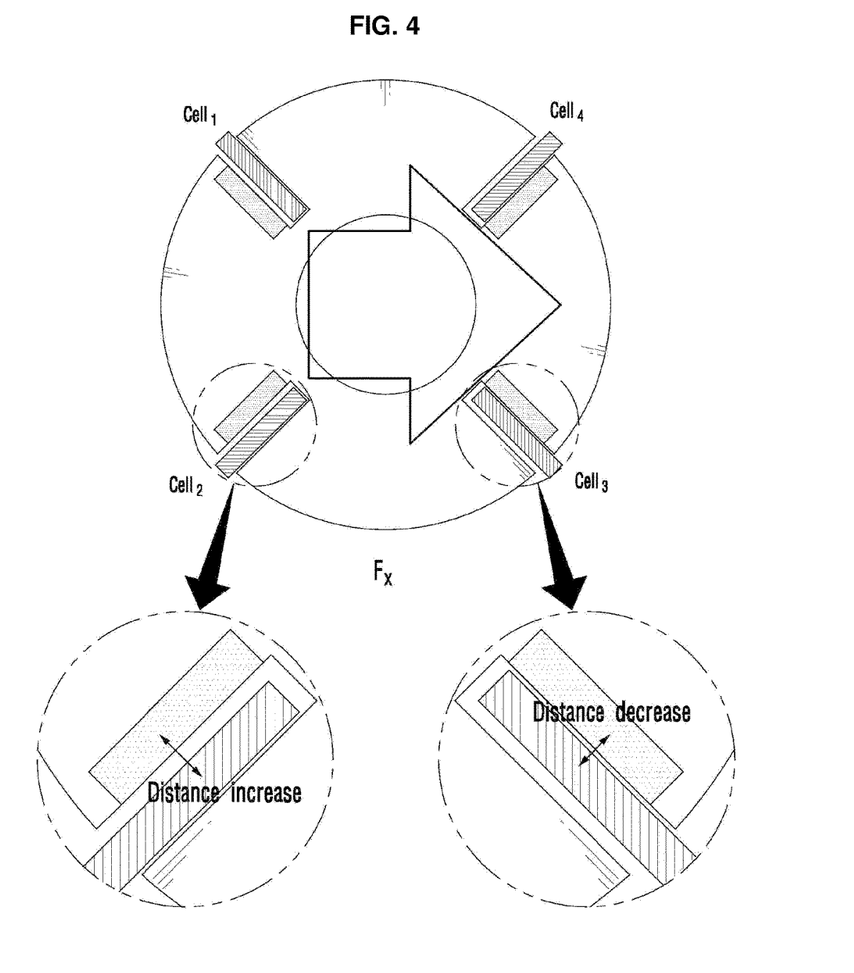
FIG. 4 is a plan view illustrating variations in capacitance when a force in the X-axis direction is exerted on the capacitive torque sensor according to an embodiment of the present disclosure.

In the following description, for the sake of convenient explanation, as shown in FIG. 4, four sensing cells arrayed in a counterclockwise direction will be referred to as a first sensing cell $Cell_1$, a second sensing cell $Cell_2$, a third sensing cell $Cell_3$, and a fourth sensing cell $Cell_4$, respectively, and variations in capacitance of the respective sensing cells when external force/torque are exerted on the torque sensor will now be described.

FIG. 4 is a plan view illustrating variations in capacitance when a force Fx in the X-axis direction is exerted on the capacitive torque sensor according to an embodiment of the present disclosure.

When the X-axis force Fx is exerted on the torque sensor according to an embodiment of the present disclosure, as shown in FIG. 4, the ground plate 20 may be moved by the X-axis force Fx toward the direction of the X-axis force Fx.

According to the movement of the ground plate 20, distances between the protruding bar 21-1 and the electrode 12-1 and between the protruding bar 21-2 and the electrode 12-2 are increased in the first sensing cell $Cell_1$ and the second sensing cell $Cell_2$.

On the contrary, distances between the protruding bar 21-3 and the electrode 12-3 and between the protruding bar 21-4 and the electrode 12-4 are decreased in the third sensing cell $Cell_3$ and the fourth sensing cell $Cell_4$.

Figure 10:
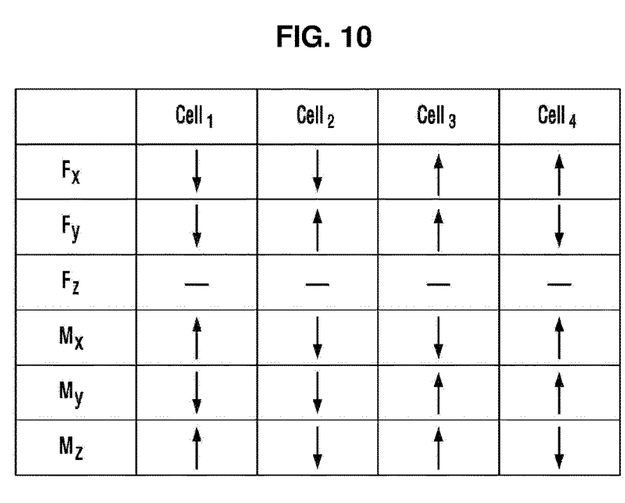
FIG. 10 is a table illustrating variations in capacitances measured from various cells when 3-axis forces/torques are exerted on the capacitive torque sensor according to an embodiment of the present disclosure.

Therefore, as shown in FIG. 10, capacitances measured from the first sensing cell $Cell_1$ and the second sensing cell $Cell_2$ are decreased, and capacitances measured from the third sensing cell $Cell_3$ and the fourth sensing cell $Cell_4$ are increased.

Figure 5:
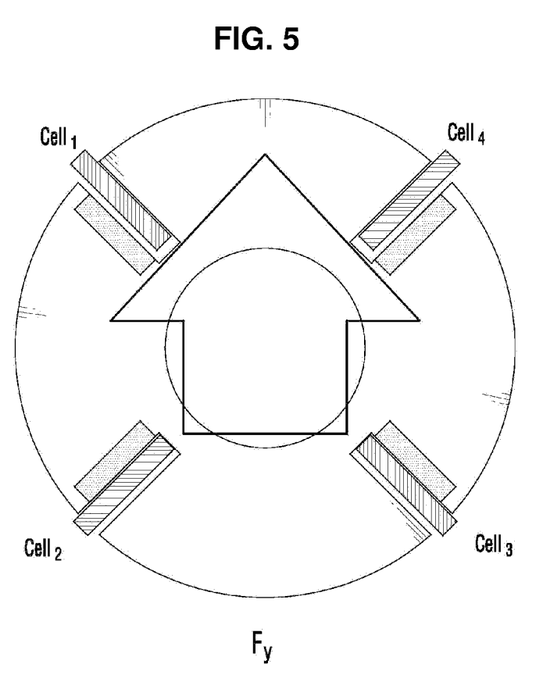
FIG. 5 is a plan view illustrating variations in capacitance when a force in the Y-axis direction is exerted on the capacitive torque sensor according to an embodiment of the present disclosure.

FIG. 5 is a plan view illustrating variations in capacitance when a force Fy in the Y-axis direction is exerted on the capacitive torque sensor according to an embodiment of the present disclosure.

When the Y-axis force Fy is exerted on the torque sensor according to an embodiment of the present disclosure, as shown in FIG. 5, the ground plate 20 may be moved by the Y-axis force Fy toward the direction of the Y-axis force Fy.

According to the movement of the ground plate 20, distances between the protruding bar 21-2 and the electrode 12-2 and between the protruding bar 21-3 and the electrode 12-3 are decreased in the second sensing cell $Cell_2$ and the third sensing cell $Cell_3$.

On the contrary, distances between the protruding bar 21-4 and the electrode 12-4 and between the protruding bar 21-1 and the electrode 12-1 are increased in the fourth sensing cell $Cell_4$ and the first sensing cell $Cell_1$.

Therefore, as shown in FIG. 10, capacitances measured from the second sensing cell $Cell_2$ and the third sensing cell $Cell_3$ are increased, and capacitances measured from the fourth sensing cell $Cell_4$ and the first sensing cell $Cell_1$ are decreased.

Figure 6:
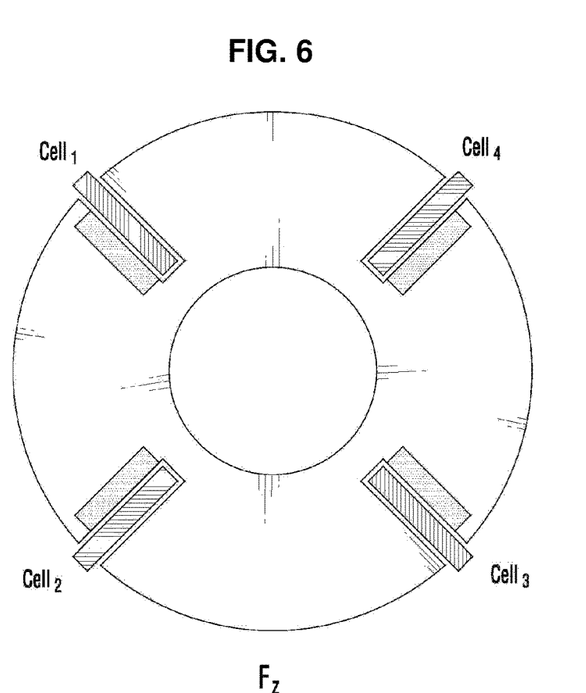
FIG. 6 is a plan view illustrating variations in capacitance when a force in the Z-axis direction is exerted on the capacitive torque sensor according to an embodiment of the present disclosure.

FIG. 6 is a plan view illustrating variations in capacitance when a force Fz in the Z-axis direction is exerted on the capacitive torque sensor according to an embodiment of the present disclosure.

When the Z-axis force Fz is exerted on the torque sensor according to an embodiment of the present disclosure, as shown in FIG. 6, the ground plate 20 may be moved toward the direction of the Z-axis force Fz.

However, as shown in FIG. 6, according to the movement of the ground plate 20, there are no changes in distances between each of the protruding bars 21-1, 21-2, 21-3 and 21-4 and each of the electrodes 12-1, 12-2, 12-3 and 12-4 in the first to fourth sensing cells $Cell_1$-$Cell_4$. In addition, there are no changes in facing areas of each of the protruding bars 21-1, 21-2, 21-3 and 21-4 and each of the electrodes 12-1, 12-2, 12-3 and 12-4.

Therefore, as shown in FIG. 10, there are no variations in capacitances measured from the first to fourth sensing cells $Cell_1$-$Cell_4$.

Figure 7:
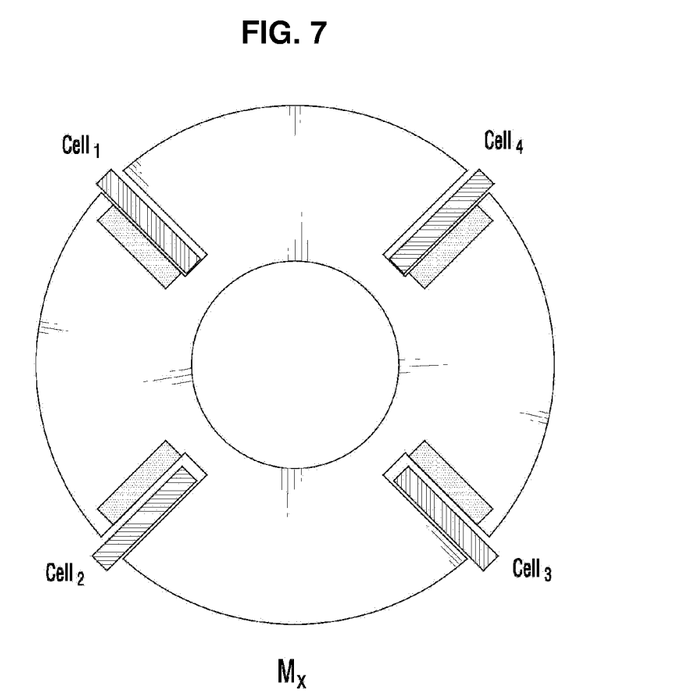
FIG. 7 is a plan view illustrating variations in capacitance when a torque in the X-axis direction is exerted on the capacitive torque sensor according to an embodiment of the present disclosure.

FIG. 7 is a plan view illustrating variations in capacitance when a torque Mx in the X-axis direction is exerted on the capacitive torque sensor according to an embodiment of the present disclosure.

When the X-axis torque Mx is exerted on the torque sensor according to an embodiment of the present disclosure, the ground plate 20 may rotate about the X axis by the X-axis torque Mx.

According to the movement of the ground plate 20, as shown in FIG. 7, distances between the protruding bar 21-2 and the electrode 12-2 and between the protruding bar 21-3 and the electrode 12-3 are increased in the second sensing cell $Cell_2$ and the third sensing cell $Cell_3$.

On the contrary, distances between the protruding bar 21-4 and the electrode 12-4 and between the protruding bar 21-1 and the electrode 12-1 are decreased in the fourth sensing cell $Cell_4$ and the first sensing cell $Cell_1$.

Therefore, as shown in FIG. 10, capacitances measured from the second sensing cell $Cell_2$ and the third sensing cell Cell₃ are decreased, and capacitances measured from the fourth sensing cell Cell₄ and the first sensing cell Cell₁ are increased.

Figure 8:
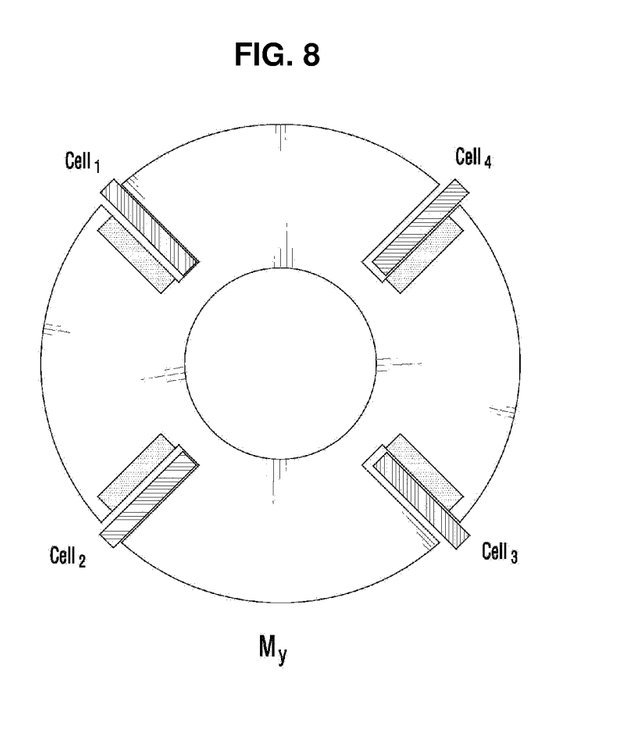
FIG. 8 is a plan view illustrating variations in capacitance when a torque in the Y-axis direction is exerted on the capacitive torque sensor according to an embodiment of the present disclosure.

FIG. 8 is a plan view illustrating variations in capacitance when a torque My in the Y-axis direction is exerted on the capacitive torque sensor according to an embodiment of the present disclosure.

When the Y-axis torque My is exerted on the torque sensor according to an embodiment of the present disclosure, the ground plate 20 may rotate about the Y axis by the Y-axis torque My.

According to the movement of the ground plate 20, as shown in FIG. 8, distances between the protruding bar 21-1 and the electrode 12-1 and between the protruding bar 21-2 and the electrode 12-2 are increased in the first sensing cell Cell₁ and the second sensing cell Cell₂.

On the contrary, distances between the protruding bar 21-3 and the electrode 12-3 and between the protruding bar 21-4 and the electrode 12-4 are decreased in the third sensing cell Cell₃ and the fourth sensing cell Cell₄.

Therefore, as shown in FIG. 10, capacitances measured from the first sensing cell Cell₁ and the second sensing cell Cell₂ are decreased, and capacitances measured from the third sensing cell Cell₃ and the fourth sensing cell Cell₄ are increased.

Figure 9:
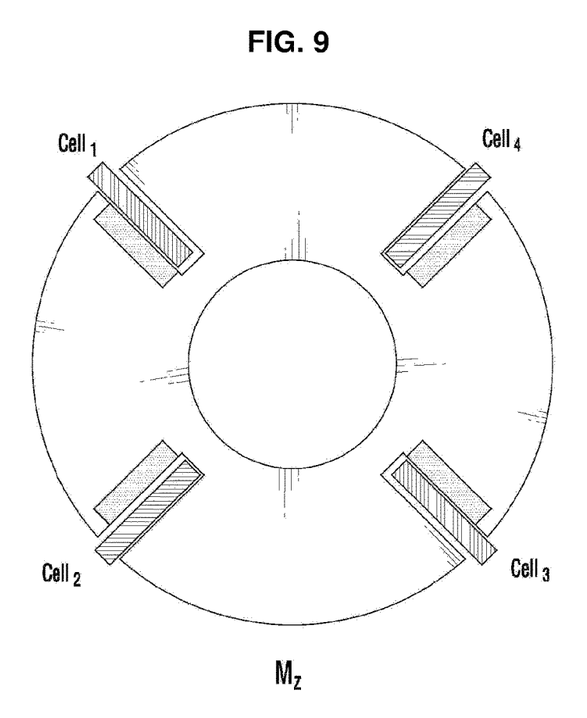
FIG. 9 is a plan view illustrating variations in capacitance when a torque in the Z-axis direction is exerted on the capacitive torque sensor according to an embodiment of the present disclosure.

FIG. 9 is a plan view illustrating variations in capacitance of the capacitive torque sensor according to an embodiment of the present disclosure when a torque Mz in the Z-axis direction is exerted.

When the Z-axis torque Mz is exerted on the torque sensor according to an embodiment of the present disclosure, the ground plate 20 may rotate about the Z axis by the Y-axis torque My.

According to the movement of the ground plate 20, as shown in FIG. 9, distances between the protruding bar 21-1 and the electrode 12-1 and between the protruding bar 21-3 and the electrode 12-3 are increased in the first sensing cell Cell₁ and the third sensing cell Cell₃.

On the contrary, distances between the protruding bar 21-2 and the electrode 12-2 and between the protruding bar 21-4 and the electrode 12-4 are increased in the second sensing cell Cell₂ and the fourth sensing cell Cell₄.

Therefore, as shown in FIG. 10, capacitances measured from the first sensing cell Cell₁ and the third sensing cell Cell₃ are increased, and capacitances measured from the second sensing cell Cell₂ and the fourth sensing cell Cell₄ are decreased.

The variations in capacitances of the first to fourth sensing cells when 3-axis forces/torques are exerted on the capacitive torque sensor according to an embodiment of the present disclosure have been described above.

As confirmed from Table shown in FIG. 10, when X-axis force/torque and Y-axis force/torque are exerted on the capacitive torque sensor according to an embodiment of the present disclosure, a pair of sensing cells arrayed at angular intervals of 180 degrees, have opposite variations in capacitance.

That is to say, when the capacitance of the first sensing cell Cell₁ is decreased (↓), the capacitance of the third sensing cell Cell₃ is increased (↑), and when the capacitance of the first sensing cell Cell₁ is increased (↑), the capacitance of the third sensing cell Cell₃ is decreased (↓). In addition, when the capacitance of the second sensing cell Cell₂ is decreased (↓), the capacitance of the fourth sensing cell Cell₄ is increased (↑), and when the capacitance of the second sensing cell Cell₂ is increased (↑), the capacitance of the fourth sensing cell Cell₄ is decreased (↓).

In addition, when a Z-axis force is exerted on the capacitive torque sensor according to an embodiment of the present disclosure, there are no variations (–) in capacitances of the first to fourth sensing cells, and when the Z-axis torque is exerted on the capacitive torque sensor according to an embodiment of the present disclosure, a pair of sensing cells arrayed at angular intervals of 180 degrees, have equal capacitance variation values.

Therefore, when the electrodes and the protruding bars, which constitute the first to fourth sensing cells, have equal sizes and distances, magnitudes of capacitance variation values of the first to fourth sensing cells are also equal to one another. Accordingly, an arithmetic unit may calculate a sensing value (M) of the capacitive torque sensor according to an embodiment of the present disclosure using the following equation (1), and the sensing value M is output only in a case where the Z-axis torque is exerted on the capacitive torque sensor. In other cases where the X-axis force/torque, the Y-axis force/torque and the Z-axis force are exerted, the sensing value M is zero.

$$M = Cell_1 - Cell_2 + Cell_3 - Cell_4 \qquad (1)$$

wherein $Cell_1$ is a capacitance variation value of the first sensing cell, $Cell_2$ is a capacitance variation value of the second sensing cell, $Cell_3$ is a capacitance variation value of the third sensing cell, and $Cell_4$ is a capacitance variation value of the fourth sensing cell, and (+) and (–) values refer to relative increase and decrease of capacitances.

Therefore, according to the present disclosure, the influences of the forces/torques in all directions, except for the torque in the direction of the reference axis (i.e., Z axis perpendicular to the sensing plate), can be decoupled just using a simple summation process of the capacitance variation values measured from the first to fourth sensing cells arrayed at angular intervals of 90 degrees using the equation (1).

In addition, in the capacitive torque sensor according to an embodiment of the present disclosure, even if the magnitudes of capacitance variation values of the first to fourth sensing cells are not equal to one another, the influences of the forces and torques in all directions, except for the torque in the direction of the reference axis (i.e., Z axis perpendicular to the sensing plate), can be decoupled using weighted values given to the capacitance variation values of the respective sensing cells, as expressed in the following equation (2):

$$M = SF_1 * Cell_1 - SF_2 * Cell_2 + SF_3 * Cell_3 - SF_4 * Cell_4 \qquad (2)$$

wherein $Cell_1$ is a capacitance variation value of the first sensing cell, $Cell_2$ is a capacitance variation value of the second sensing cell, $Cell_3$ is a capacitance variation value of the third sensing cell, and $Cell_4$ is a capacitance variation value of the fourth sensing cell, and $SF_1$, $SF_2$, $SF_3$, and $SF_4$ are weighted values given to make the respective sensing cells have equal capacitance variation values when the capacitance variation values of the first to fourth sensing cells are not equal to one another. The weighted values can be experimentally determined and may be a constant or a function having a distance between the protruding bar and the electrode as a variable.

While variations in capacitance when force is applied in positive X-, Y- or Z-axis direction or torque is exerted in clockwise X-, Y- and Z-axis direction have been described above with reference to FIGS. 3 to 8, it can be understood that the variations in capacitance will be caused even when force is applied in negative X-, Y- or Z-axis direction and torque is exerted in counterclockwise X-, Y- or Z-axis direction.

That is to say, when the X- or Y-axis force/torque is exerted, the pair of sensing cells arrayed at angular intervals of 180 degrees have opposite variations in capacitance.

In addition, when the Z-axis force is exerted, there are no variations in capacitances of the first to fourth sensing cells, and when the Z-axis torque is exerted, a pair of sensing cells arrayed at angular intervals of 180 degrees have equal variations in capacitance.

In addition, in order to explain the movement of the capacitive torque sensor according to an embodiment of the present disclosure when external force/torque are exerted, the movement of the ground plate in a state in which the sensing plate is fixed has been described above by way of example.

In the state in which the sensing plate is fixed, however, the sensing plate may be moved by external force/torque or both the ground plate and the sensing plate may be moved while one of the ground plate and the sensing plate is moved to a greater extent. Even in such a case, it will also be understood that symmetrical variations in capacitances are generated from the first to fourth sensing cells and the influences of the forces/torques in all directions, except for the torque in the Z-axis direction, can be offset accordingly.

In addition, to offset the influences of the forces/torques in all directions except for the torque in the Z-axis direction, the capacitive torque sensor according to an embodiment of the present disclosure does not require a flexture hinge having a complicated mechanism or a special shape, or a flexture hinge of special material. Therefore, the capacitive torque sensor according to an embodiment of the present disclosure can advantageously achieve miniaturization.

While the torque sensor of the present disclosure has been particularly shown and described with reference to an exemplary specific embodiment thereof, it will be understood by those of ordinary skill in the art that various changes in form and details may be made therein without departing from the spirit and scope of the present disclosure as defined by the following claims.

DESCRIPTION OF REFERENCE NUMERALS

10: Sensing plate
11, 11-1, 11-2, 11-3 and 11-4: Grooves
12, 12-1, 12-2, 12-3 and 12-4: Electrodes
20: Ground plate
21, 21-1, 21-2, 21-3 and 21-4: Protruding bars

What is claimed is:

1. A capacitive torque sensor comprising:
a sensing plate including four grooves formed at angular intervals of 90 degrees on the basis of a center and four electrodes located at one-side of the four grooves; and
a ground plate including four protrusion bars inserted into the four grooves of the sensing plate,
wherein electrodes located at one-side of a pair of grooves formed at angular intervals of 180 degrees, among the four grooves, are arrayed to be at a clockwise one-side of the pair of grooves, and electrodes located at one-side of the other pair of grooves formed at angular intervals of 180 degrees are arrayed to be at a counterclockwise one-side of the other pair of the grooves, and the ground plate moves relative to the sensing plate when external force/torque are exerted.

2. The capacitive torque sensor of claim 1, wherein the sensing plate is a circular plate having the center as a center of the circular plate, and the four grooves are cut out from the circumference to the inside of the circular plate.

3. The capacitive torque sensor of claim 1, wherein the grooves are cut out along a cutting line extending from the circumference to the center of the circular plate.

4. The capacitive torque sensor of claim 3, wherein the grooves are in rotational symmetry about the center.

5. The capacitive torque sensor of claim 1, wherein the protruding bars inserted into the four grooves are parallel with the electrodes.

6. The capacitive torque sensor of claim 5, wherein the protruding bars have isosceles trapezoid shaped sections.

7. The capacitive torque sensor of claim 1, wherein the sensing plate is a printed circuit board.

8. The capacitive torque sensor of claim 1, wherein the capacitive torque sensor has first to fourth sensing cells and each sensing cell is constituted by one protruding bar inserted into one groove of the four grooves and one electrode located at one-side of the one groove; and
assuming that two axes orthogonal to each other on a plane parallel with the sensing plate are denoted by an X axis and a Y axis, and an axis perpendicular to the X axis and the Y axis is denoted by a Z axis, the first to fourth sensing cells are designed such that a pair of sensing cells arrayed at angular intervals of 180 degrees, among the first to fourth sensing cells, have opposite variations in capacitance by force/torque in a X-axis direction, force/torque in a Y-axis direction, and a torque in a Z-axis direction; there are no variations in capacitances of the first to fourth sensing cells by a force in the Z-axis direction; and capacitances of a pair of sensing cells, among two pairs of sensing cells arrayed at angular intervals of 180 degrees, are increased, while capacitances of the other pair of sensing cells are decreased.

9. The capacitive torque sensor of claim 8, further comprising an arithmetic unit outputting capacitance variation values of the first to fourth sensing cells and sensing values M calculated by the following equation:

$$M = SF_1 * Cell_1 - SF_2 * Cell_2 + SF_3 * Cell_3 - SF_4 * Cell_4$$

wherein $Cell_1$ is a capacitance variation value of the first sensing cell, $Cell_2$ is a capacitance variation value of the second sensing cell, $Cell_3$ is a capacitance variation value of the third sensing cell, $Cell_4$ is a capacitance variation value of the fourth sensing cell, and $SF_1$, $SF_2$, $SF_3$, and $SF_4$ are weighted values for the first to fourth sensing cells.

10. The capacitive torque sensor of claim 9, wherein the sensing values are output only when the Z-axis torque is exerted, and the sensing value is zero when the X-axis force/torque, the Y-axis force/torque and the Z-axis force are exerted.

11. The capacitive torque sensor of claim 2, wherein first to fourth sensing cells are constituted by the protruding bars inserted into the grooves and the electrodes located at one-side of the grooves; and
assuming that two axes orthogonal to each other on a plane parallel with the sensing plate are denoted by an X axis and a Y axis, and an axis perpendicular to the X axis and the Y axis is denoted by a Z axis, a pair of sensing cells arrayed at angular intervals of 180 degrees, among the first to fourth sensing cells, have opposite variations in capacitance by force/torque in a X-axis direction, force/torque in a Y-axis direction, and a torque in a Z-axis direction, there are no changes in capacitances of the first to fourth sensing cells by a force in the Z-axis direction, and capacitances of a pair of sensing cells, among two pairs of sensing cells arrayed at angular intervals of 180 degrees, are increased, while capacitances of the other pair of sensing cells are decreased.

12. The capacitive torque sensor of claim 11, further comprising an arithmetic unit outputting capacitance variation values of the first to fourth sensing cells and sensing values M calculated by the following equation:

$$M=SF_1*Cell_1-SF_2*Cell_2+SF_3*Cell_3-SF_4*Cell_4$$

wherein $Cell_1$ is a capacitance variation value of the first sensing cell, $Cell_2$ is a capacitance variation value of the second sensing cell, $Cell_3$ is a capacitance variation value of the third sensing cell, $Cell_4$ is a capacitance variation value of the fourth sensing cell, and $SF_1$, $SF_2$, $SF_3$, and $SF_4$ are weighted values for the first to fourth sensing cells.

13. The capacitive torque sensor of claim 12, wherein the sensing values are output only when the Z-axis torque is exerted, and the sensing value is zero when the X-axis force/torque, the Y-axis force/torque and the Z-axis force are exerted.

14. The capacitive torque sensor of claim 3, wherein first to fourth sensing cells are constituted by the protruding bars inserted into the grooves and the electrodes located at one-side of the grooves; and assuming that two axes orthogonal to each other on a plane parallel with the sensing plate are denoted by an X axis and a Y axis, and an axis perpendicular to the X axis and the Y axis is denoted by a Z axis, a pair of sensing cells arrayed at angular intervals of 180 degrees, among the first to fourth sensing cells, have opposite variations in capacitance by force/torque in a X-axis direction, force/torque in a Y-axis direction, and a torque in a Z-axis direction, there are no variations in capacitances of the first to fourth sensing cells by a force in the Z-axis direction, and capacitances of a pair of sensing cells, among two pairs of sensing cells arrayed at angular intervals of 180 degrees, are increased, while capacitances of the other pair of sensing cells are decreased.

15. The capacitive torque sensor of claim 14, further comprising an arithmetic unit outputting capacitance variation values of the first to fourth sensing cells and sensing values M calculated by the following equation:

$$M=SF_1*Cell_1-SF_2*Cell_2+SF_3*Cell_3-SF_4*Cell_4$$

wherein $Cell_1$ is a capacitance variation value of the first sensing cell, $Cell_2$ is a capacitance variation value of the second sensing cell, $Cell_3$ is a capacitance variation value of the third sensing cell, $Cell_4$ is a capacitance variation value of the fourth sensing cell, and $SF_1$, $SF_2$, $SF_3$, and $SF_4$ are weighted values for the first to fourth sensing cells.

16. The capacitive torque sensor of claim 15, wherein the sensing values are output only when the Z-axis torque is exerted, and the sensing value is zero when the X-axis force/torque, the Y-axis force/torque and the Z-axis force are exerted.

17. The capacitive torque sensor of claim 5, wherein first to fourth sensing cells are constituted by the protruding bars inserted into the grooves and the electrodes located at one-side of the grooves; and assuming that two axes orthogonal to each other on a plane parallel with the sensing plate are denoted by an X axis and a Y axis, and an axis perpendicular to the X axis and the Y axis is denoted by a Z axis, a pair of sensing cells arrayed at angular intervals of 180 degrees, among the first to fourth sensing cells, have opposite variations in capacitance by force/torque in a X-axis direction, force/torque in a Y-axis direction, and a torque in a Z-axis direction, there are no variations in capacitances of the first to fourth sensing cells by a force in the Z-axis direction, and capacitances of a pair of sensing cells, among two pairs of sensing cells arrayed at angular intervals of 180 degrees, are increased, while capacitances of the other pair of sensing cells are decreased.

18. The capacitive torque sensor of claim 17, further comprising an arithmetic unit outputting capacitance variation values of the first to fourth sensing cells and sensing values M calculated by the following equation:

$$M=SF_1*Cell_1-SF_2*Cell_2+SF_3*Cell_3-SF_4*Cell_4$$

wherein $Cell_1$ is a capacitance variation value of the first sensing cell, $Cell_2$ is a capacitance variation value of the second sensing cell, $Cell_3$ is a capacitance variation value of the third sensing cell, $Cell_4$ is a capacitance variation value of the fourth sensing cell, and $SF_1$, $SF_2$, $SF_3$, and $SF_4$ are weighted values for the first to fourth sensing cells.

19. The capacitive torque sensor of claim 18, wherein the sensing values are output only when the Z-axis torque is exerted, and the sensing value is zero when the X-axis force/torque, the Y-axis force/torque and the Z-axis force are exerted.

* * * * *